Patented Sept. 16, 1930

1,775,636

UNITED STATES PATENT OFFICE

CHARLES BOGIN AND CARSON W. SIMMS, OF TERRE HAUTE, INDIANA, ASSIGNORS TO COMMERCIAL SOLVENTS CORPORATION, OF TERRE HAUTE, INDIANA, A CORPORATION OF MARYLAND

ESTERS OF ALPHA HYDROXY-ISO-BUTYRIC ACID

No Drawing.   Application filed May 12, 1928.  Serial No. 277,388.

Our present invention relates to new compositions of matter comprising the esters of alpha hydroxyisobutyric acid with monohydric alcohols having more than two carbon atoms. This type of compound is represented by the following structural formula:

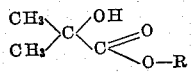

in which, the n-propyl, isopropyl, n-butyl, isobutyl, amyl, etc. radicals may be substituted for R. The butyl ester for example, has the following formula:

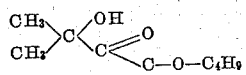

The n-butyl ester of alpha hydroxyisobutyric acid is a very mild and pleasant smelling liquid which boils at 110–114° C. under about 75 mm. pressure. It is insoluble in water and only very slightly hydrolized on long heating with water. It is an excellent solvent for nitrocellulose and due to this property can be very advantageously employed in the production of nitrocellulose lacquers, such as brush lacquers or architectural lacquers, which require the use of solvents evaporating at fairly slow rates. Other properties, such as compatibility with gums and oils together with the fact that relatively large amounts of cheap petroleum hydrocarbon diluents and turpentine may be added to a solution of nitrocellulose in the said solvent without causing the precipitation of the nitrocellulose, add to its value as a solvent in the lacquer industry. The n-butyl ester of alpha hydroxyisobutyric acid may also be advantageously used for other purposes.

The other esters of alpha hydroxyisobutyric acid with monohydric alcohols having more than two carbon atoms have, in general, properties similar to those of the n-butyl ester and may be employed similarly.

The esters of alpha hydroxyisobutyric acid with alcohols containing more than two carbon atoms may be prepared in a number of ways. For example, alpha hydroxyisobutyric acid may be obtained from acetone by the cyanhydrin reaction and the ester then prepared by esterifying the acid thus obtained with the desired alcohol. The preparation of the normal propyl ester of alpha hydroxyisobutyric acid by this method will be described merely as an example of one method of obtaining our new compositions.

To 250 grams of alpha hydroxyisobutyric acid, prepared by any suitable method, 160 grams of normal propyl alcohol and 200 grams of benzol are added and esterification effected by the aid of approximately 5 grams of sulphuric acid as a catalyst. The water produced by the esterification is removed from the reaction zone as a component of a binary constant boiling point mixture with benzol, the latter being separated from the condensate and returned to the reaction mixture. When tests show that the esterification is practically complete, the reaction mixture is neutralized with concentrated sodium hydroxide solution. The desired ester is then recovered by distillation in vacuo. The n-propyl alpha hydroxyisobutyrate prepared as above described boils at 164°–165° C., has a density of 0.9639 at 20° C/20° C. and is soluble in water to the extent of about 10%.

The isopropyl ester of alpha hydroxyisobutyric acid, prepared in a similar manner to that described above, boils at 150°–153° C., has a density of 0.9477 at 20° C./20° C. and is soluble in water to the extent of about 15%.

Another convenient method of obtaining the esters of higher boiling point is by alcoholysis, methyl, or preferably, ethyl alpha hydroyisobutyrate being reacted with the alcohol, the radical of which it is desired to substitute for the methyl or ethyl radical. The preparation of n-butyl alpha hydroxyisobutyrate is described merely as an example of this method.

Example: 12.0 gram mols of ethyl alpha hydroxyisobutyrate, 15.0 gram mols of n-butyl alcohol and 0.25 gram mol 95% sulphuric acid are heated in a flask provided with a fractionating column. Sufficient heat is maintained under the flask to keep the vapor temperature at 80° to 85° C. Under these conditions a reaction takes place between the n-butyl alcohol and the ethyl alpha hydroxyisobutyrate with the formation of ethyl alcohol and n-butyl alpha hydroxyisobutyrate. The removal of the ethyl alcohol, together with small amounts of other materials present from the reaction zone by distillation, allows the reaction to go to completion. The vapor temperature reaches 97° to 100° C. and the liquid temperature 150° C. when the reaction is complete. The reaction mixture remaining in the flask is then cooled, washed with water, then with sodium carbonate solution, and finally again with water. It is then dried with sodium sulphate and fractionally distilled. The first fraction thus obtained consists of n-butyl alcohol and water, the second of n-butyl alcohol and n-butyl alpha hydroxyisobutyrate, and the last of the practically pure ester.

The isobutyl ester of alpha hydroxyisobutyric acid may be prepared in a manner similar to the corresponding n-butyl ester described above. It boils at approximately 173° C. at atmospheric pressure. It is soluble in water to the extent of about 3% at ordinary temperature. Its density is 0.9447 at 20° C./20° C.

The amyl ester of alpha hydroxyisobutyric acid boils at 190°–1° C. at atmospheric pressure, has a density of 0.9350 at 20° C./20° C. and is soluble in water to the extent of less than 1%.

All of the compounds described above are practically colorless liquids which have rather mild, pleasant odors.

Now having described our invention, what we claim as new and novel is:

1. As new compositions of matter, esters of alpha hydroxyisobutyric acid, whose molecular structure is expressed by the following formula:

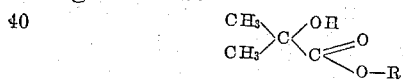

where R represents the radical of a monohydric alcohol having more than two carbon atoms.

2. As a new composition of matter, the butyl ester of alpha hydroxyisobutyric acid, whose molecular structure is expressed by the following formula:

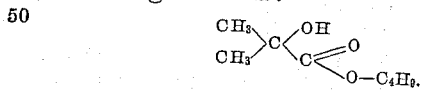

In testimony whereof we affix our signatures.

CHARLES BOGIN.
CARSON W. SIMMS.